(12) United States Patent
Jones

(10) Patent No.: US 6,809,758 B1
(45) Date of Patent: Oct. 26, 2004

(54) AUTOMATED STABILIZATION METHOD FOR DIGITAL IMAGE SEQUENCES

(75) Inventor: Paul W. Jones, Churchville, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/474,723

(22) Filed: Dec. 29, 1999

(51) Int. Cl.$^7$ .............................. H04N 5/14; H04N 9/64
(52) U.S. Cl. .................. 348/208.99; 348/700; 348/699
(58) Field of Search ........................... 348/208, 208.99, 348/208.1, 208.4, 208.3, 208.12, 699, 700; 382/168, 172

(56) References Cited

U.S. PATENT DOCUMENTS

| | | | | |
|---|---|---|---|---|
| 5,111,511 A | * | 5/1992 | Ishii et al. .................... | 382/107 |
| 5,473,379 A | * | 12/1995 | Horne .................... | 375/240.16 |
| 5,510,834 A | * | 4/1996 | Weiss et al. .................... | 348/97 |
| 5,592,226 A | * | 1/1997 | Lee et al. .................... | 254/230 |
| 5,629,988 A | | 5/1997 | Burt et al. .................... | 382/276 |
| 5,734,933 A | * | 3/1998 | Sekine et al. .................... | 396/55 |
| 5,748,231 A | * | 5/1998 | Park et al. .................... | 348/207.99 |
| 5,748,321 A | | 5/1998 | Burks et al. .................... | 356/386 |
| 6,072,542 A | * | 6/2000 | Wilcox et al. .................... | 348/722 |
| 6,298,144 B1 | * | 10/2001 | Pucker et al. .................... | 382/103 |

FOREIGN PATENT DOCUMENTS

| EP | 0 358 267 A2 | 3/1990 | .......... H04N/7/137 |
|---|---|---|---|
| EP | 0 458 239 A2 | 11/1991 | ............ H04N/5/14 |
| EP | 0 468 628 A2 | 1/1992 | ............ H04N/7/01 |

OTHER PUBLICATIONS

"An Adaptive Motion Decision System for Digital Image Stabilizer Based on Edge Pattern Matching" by Joon Ki Paik, Yong Chul Park, and Dong Wook Kim. IEEE Transactions on Consumer Electronics, 38 (Aug. 1992), No. 3, New York.

* cited by examiner

Primary Examiner—Wendy R. Garber
Assistant Examiner—Kelly L. Jerabek
(74) Attorney, Agent, or Firm—David M. Woods

(57) ABSTRACT

A method and structure for stabilizing a motion image formed using a sequence of successive frames which includes calculating a motion vector field between adjacent frames; forming a motion vector histogram from horizontal and vertical components of the motion vector field; applying a threshold to the motion vector histogram to produce a thresholded motion vector histogram; generating average horizontal and vertical motion components from the thresholded motion vector histogram; filtering the average horizontal and vertical motion components over a number of frames to identify unwanted horizontal and vertical motion components for each of the frames; and stabilizing the image sequence by shifting each frame according to the corresponding unwanted horizontal and vertical motion components.

37 Claims, 3 Drawing Sheets

AUTOMATED STABILIZATION METHOD FOR DIGITAL IMAGE SEQUENCES

FIELD OF THE INVENTION

The present invention generally relates to digital image processing and more particularly to a system and method for removing unwanted motion in digital image sequence.

BACKGROUND OF THE INVENTION

Digital image sequences, such as those obtained from digital video cameras or from the scanning of motion picture film, often contain unwanted motion between successive frames in the sequence. There are many potential causes of this unwanted motion, including camera shake at the time of image capture, or frame-to-frame positioning errors (also known as jitter or hop and weave) when a film sequence is scanned. The process of removing this unwanted motion is termed image stabilization.

Some systems use optical, mechanical, or other physical means to correct for the unwanted motion at the time of capture of scanning. However, these systems are often complex and expensive, and they cannot correct for unwanted motion in a digital image sequence that was produced by an unknown and uncharacterized device. To provide stabilization for a generic digital image sequence, several digital image processing methods have been developed and described in the prior art.

A number of digital image processing methods use a specific camera motion model to estimate one or more parameters such as zoom, translation, rotation, etc. between successive frames in the sequences. These parameters are computed from a motion vector field that describes the correspondence between image points in two successive frames. The resulting parameters can then be filtered over a number of frames to provide smooth motion. An examples of such a system can be found in U.S. Pat. No. 5,629,988 to Burt et al. A fundamental assumption in these systems is that a global transformation dominates the motion between adjacent frames. In the presence of significant local motion, such as multiple objects moving with independent motion trajectories, these methods may fail due to the computation of erroneous global motion parameters.

Other image processing methods for digital image stabilization are designed primarily for digital video camera applications where system constraints include minimal buffering requirements and near real-time processing. As a result, these methods are limited to applying unwanted motion correction between only two frames at a given time, which prohibits filtering of the motion parameters over multiple frames. An example of such a system is described in U.S. Pat. No. 5,748,231 to Park et al. In this method, a weighted average motion vector is computed from the motion vector field corresponding to two successive frames. The weightings are determined from various statistical measures that indicate the reliability of a given motion vector. The weighted average motion vector is then applied to remove the motion between two successive frames. This type of processing results in all motion (including desired camera motion such as pans) being removed from the sequence, not just unwanted motion. Again, these methods assume the image sequences contain a dominant global motion, and they may fail in the presence of significant local motion.

Still other digital image processing methods for removing unwanted motion make use of a technique known as phase correlation for precisely aligning successive frames. An example of such a method has been reported by Eroglu et al. ("A fast algorithm for subpixel accuracy image stabilization for Digital Film and Video," in Proc. SPIE Visual Communications and Image Processing, Vol. 3309, pp. 786–797, 1998). However, these methods require that the sequence has no local motion, or alternatively, a user must select a region in consecutive frames that has no local motion. The dependence upon areas with no local motion and the necessity for user intervention are major drawbacks of these methods.

The invention solves the problem of removing unwanted motion from a digital image sequence without removing desired motion (e.g., pan, zoom, etc.). It does so without excessive computational requirements, and it is a fully automated process. Furthermore, it is robust in the presence of significant local motion in the image sequence.

SUMMARY OF THE INVENTION

The present invention overcomes the limitations of conventional systems by using a simple model that is based on the observation that the cumulative motion vectors corresponding to the desired motion will generally vary smoothly from frame-to-frame. Further, the invention uses a motion vector histogram with a simple threshold, and does not rely on a specific camera transformation model (or the absence of local motion). It is, therefore, an object of the present invention to provide a structure and method that uses a motion vector histogram in determining the unwanted motion components in digital image sequence.

One embodiment of the invention is a method for stabilizing a digital image sequence consisting of a number of successive frames. The method includes: calculating a motion vector field between adjacent frames; forming a motion vector histogram from horizontal and vertical components of the motion vector field; applying a threshold to the motion vector histogram to produce a thresholded motion vector histogram; generating average horizontal and vertical motion components from the thresholded motion vector histogram; filtering the average horizontal and vertical motion components over a number of frames to identify unwanted horizontal and vertical motion components for each of the frames; and stabilizing the image sequence by shifting each frame according to the corresponding unwanted horizontal and vertical motion components.

The thresholding of the motion vector histogram removes undesirable motion vectors that are likely to be unreliable or correspond to objects that have a small spatial extent. This threshold can be changed for each frame by an adaptive means or can be fixed at a pre-specified level. The unwanted horizontal and vertical components correspond to high temporal frequencies, and they can be computed by applying a highpass filter to the average horizontal and vertical components. The degree of highpass filtering is user-adjustable. The stabilizing includes a displacement of each frame by the corresponding unwanted horizontal and vertical components.

Another embodiment of the invention is a computerized digital imaging system for stabilizing a digital image sequence formed from a number of successive frames including: a motion estimation unit for calculating a motion vector field between adjacent frames; a histogram generator unit for forming a motion vector histogram from horizontal and vertical components of the motion vector field; a thresholding unit for applying a threshold to the motion vector histogram to produce a thresholded motion vector histogram; and averaging unit for generating average horizontal and vertical components from the thresholded motion vector histogram; a filtering unit for filtering the average horizontal and vertical components over a number of frames to identify unwanted horizontal and vertical components for each of the frames, and a stabilizing unit for stabilizing the image sequence by translating each frame according to the corresponding unwanted horizontal and vertical components. The thresholding unit removes motion vectors that are likely to be unreliable or correspond to objects that are temporally transient or have a small spatial extent. The system further includes a threshold determination unit for adaptively computing a threshold for each frame, or alternatively, the threshold may be fixed at a pre-specified level. The filter includes a highpass filter for identifying the unwanted horizontal and vertical components. The system further includes a user interface for adjusting the degree of highpass filtering. The stabilizing unit includes a displacement unit for shifting each frame by the corresponding unwanted horizontal and vertical components.

ADVANTAGES OF THE INVENTION

One advantage produced by the invention is that unwanted global motion is removed from a digital image sequence in a fully automated operation. With the invention, no user intervention is required, although the user has access to some system parameters to control usage and degree of stabilization. Also, the invention has robust performance to different scene content. Thus, the sequence may contain substantial local motion without significantly affecting the removal of the unwanted global motion. Moreover, the desired camera motion (pan, zoom, etc.) is not removed during the inventive stabilization process.

Further, with the invention, there is a minimal computational load. The estimation of the motion vector field is the most time-consuming component. However, this can be done efficiently with block-based motion estimation methods. Additionally, the invention allows stabilization to subpixel levels (e.g., below human perceptual thresholds). Finally, the use of the motion vector histogram offers the potential for further improvements, including the tracking of multiple motion vector clusters for improved estimates of unwanted motion.

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION OF PREFERRED EMBODIMENTS OF THE INVENTION

The invention removes unwanted global motion in a digital image sequence. Unwanted motion adversely impacts overall image quality and potentially reduces performance of current compression systems such as MPEG-2. The present invention is especially useful with film-originated source material (i.e., motion pictures that have been scanned into digital form) containing unwanted jitter (also known as hop/weave), which arises from various physical components in the imaging chain (e.g., perforation nonuniformities, media instability, mechanical aspects of capture/duplication/projection devices, etc.). However, as would be known by one ordinarily skilled in the art given this disclosure, the same method could also be used to stabilize unwanted camera motion in video-originated sequences.

Figure 1:
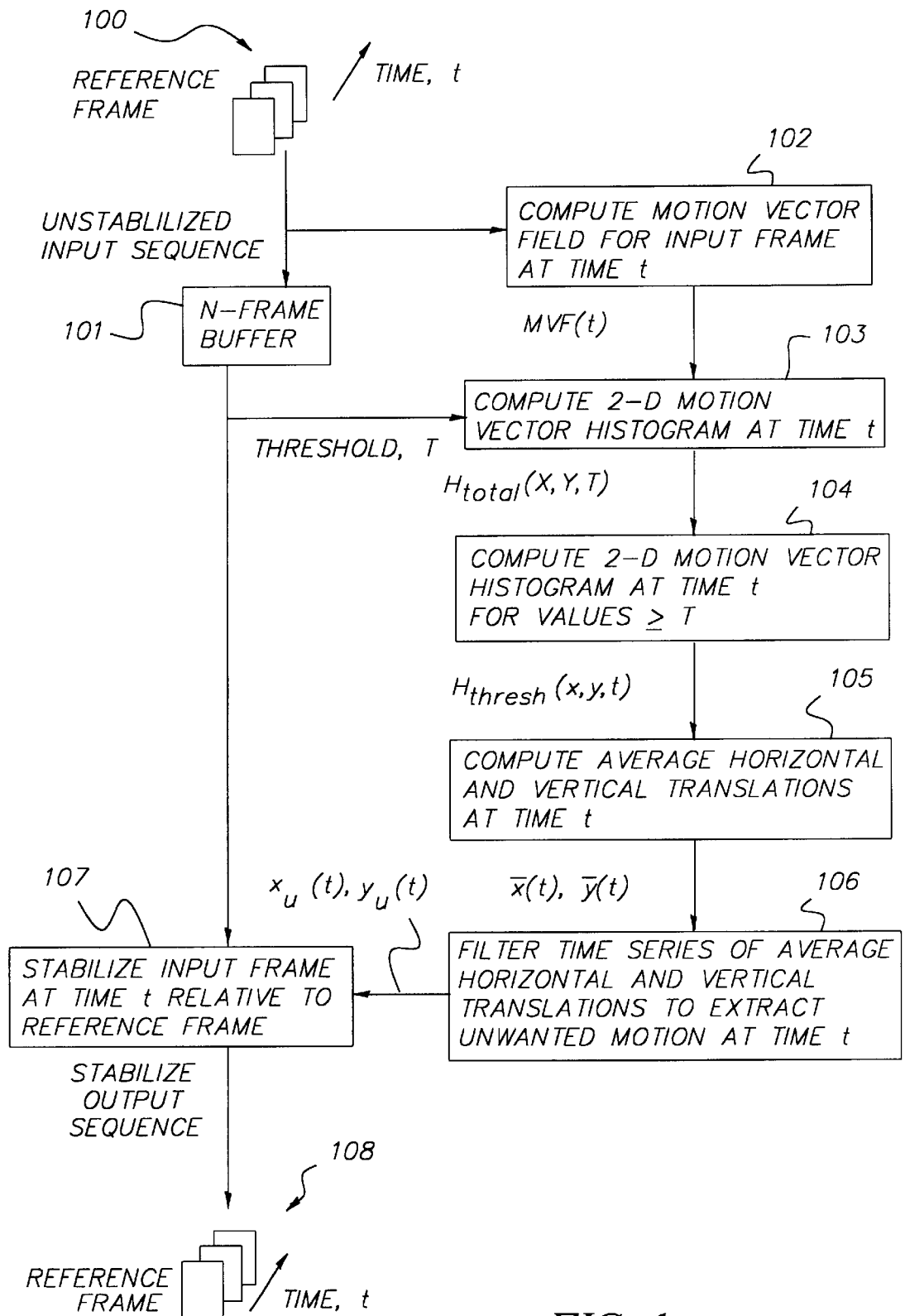
FIG. 1 is a schematic diagram illustrating an automated image stabilization method system according to the invention.

As shown in FIG. 1, each frame from the original unstabilized sequence 100 is first processed with the preceding frame using a motion estimation unit 102 to form a motion vector field MVF(t) that indicates correspondence points between the current frame at a given time t and the preceding frame at time t−1. As is known by one ordinarily skilled in the art, the computation of a motion vector field is only valid for successive frames that share at least some similarity. If the sequence consists of multiple scenes (i.e., frames with significantly different image content), it is first necessary to segment the sequence into individual scenes (whether each scene has a continuity of image content) prior to the computation of motion vectors. This process of segmenting a sequence into individual scenes is sometimes known as scene change detection, and there have been numerous descriptions of such conventional methods. Alternatively, manual methods for scene detection can be used, where a person marks each scene change after viewing the sequence. Scene change detection is not a large part of the present invention, and it is assumed that such processing has been done prior to the application of the inventive image stabilization.

The motion vector field can be formed using a variety of methods, but in a preferred embodiment, the vector field is formed using block-based motion estimation for efficient computations. As is well known to those ordinarily skilled in the art, block-based motion estimation involves forming b×b blocks of pixels from the current frame, and for each block, finding a b×b block in the preceding frame that is the best match according to some error metric. A typical value for b is 8 or 16 pixels, and mean-squared error (MSE) or mean absolute distortion (MAD) is often used as the error metric. The output of the block matching process is a n×m set of motion vectors, which comprise the motion vector field. Increasing n and/or m (i.e., increasing the density of the motion vector field) may lead to improved performance of the current invention, but the drawback is that the number of computations is increased. The invention performs adequately with moderate values for n and m. As would also be readily known by those ordinarily skilled in the art given this disclosure, other motion estimation methods, such as optical flow, could certainly be used and may provide improved performance at the expense of increased computations. As each frame is sent to the motion estimation unit 102, it is also sent to a buffer 101, which stores N frames in order to allow the unwanted motion to be removed from the original sequence during a subsequent stabilization stage 107.

The motion vector field from each pair of adjacent frames is then processed with a histogram generator unit 103 to produce a total 2-D motion vector histogram, $H_{total}(x,y,t)$ of horizontal (x) and vertical (y) translation values at a given time t. The histogram generator unit 103 computes the histogram by summing the number of occurrences of a particular (x,y) translation pair over the motion vector field.

Figure 2:
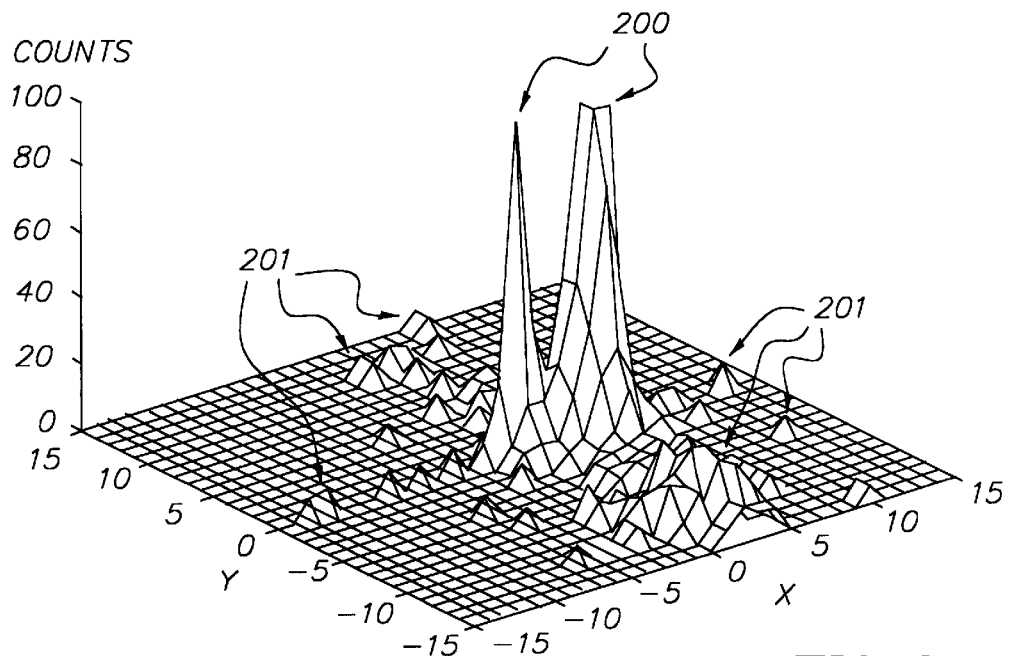
FIG. 2 is a diagram illustrating a two-dimensional (2-D) motion vector histogram according to the invention.

An example of a motion vector histogram is shown in FIG. 2. In this figure, the x and y translation values can each vary from −15 pixels to +15 pixels.

As illustrated in FIG. 2, a 2-D histogram of the motion vector components will typically contain one or more clusters 200 with a significant number of counts, where the clusters indicate regions within the image that are moving with the same velocity and direction. There will also be numerous clusters 201 continuing only a few counts, which indicates either small spatial regions or, more commonly, indicate inaccurate motion vectors (which results from noise, ambiguous signal content in the image, etc.).

Since these motion vectors clusters 201 are likely to be misleading in subsequent processing, they are preferably discarded. As would be known by one ordinarily skilled in the art given this disclosure, any number of techniques can be used to promote the removal of the clusters 201 having only a few counts. In a preferred embodiment, the removal is performed by applying a simple threshold filter to the histogram count values, i.e., retaining only those histogram values that equal or exceed a threshold T. Referring to FIG. 1, this thresholding process is performed by a thresholding unit 104. The output of the thresholding unit is a thresholded motion vector histogram $H_{thresh}(x,y,t)$.

Besides thresholding, other methods can also be introduced to reduce the number of unreliable motion vectors including discarding vectors based on: 1) the variance of a block (where low variance blocks are essentially matching noise, not features), 2) the summed error between corresponding points in matched blocks (where high error indicates the blocks are not similar), and 3) the number of blocks that match with equivalent error (where there is no way to distinguish which matched block is the proper one). All of these methods can be applied in addition to the histogram thresholding, but are not necessary to the proper functioning of the current invention.

The present invention is not particularly sensitive to any specific histogram threshold value, and the threshold T can be set to a fixed value for all frames in a sequence. However, as would be known by one ordinarily skilled in the art given this disclosure, setting the threshold too high may result in only a few vectors being retained, which can lead to unstable behavior. Likewise, setting threshold too low may result in the inclusion of inaccurate motion vectors. To reduce the potential for poor performance caused by an inappropriate threshold, it is possible to adapt the threshold for each frame. To determine this adaptive threshold, the invention models the total motion vector histogram as the sum of two components:

$$H_{total}(x,y,t) = H_{reliable}(x,y,t) + H_{unreliable}(x,y,t) \quad (1)$$

where $H_{reliable}(x,y,t)$ is the histogram component corresponding to reliable motion vectors at time t, and $H_{unreliable}(x,y,t)$ is the histogram component corresponding to unreliable motion vectors at time t.

Modeling these histogram components as random variables, it is easy to derive a relationship for the means of the histograms:

$$\mu_{total} = \mu_{reliable} + \mu_{unreliable} \quad (2)$$

where $\mu_{total}$ is the mean of $H_{total}(x,y,t)$, $\mu_{reliable}$ is the mean of $H_{reliable}(x,y,t)$, and $\mu_{unreliable}$ is the mean of $H_{unreliable}(x,y,t)$. Because the histogram values are always positive, the mean of the total histogram is always greater than the mean of the histogram for the unreliable vectors. By selecting the threshold to be the mean of the total histogram values (i.e., $T = \mu_{total}$), it is generally assured that most of the unreliable vectors will be below the threshold and hence will not be included in subsequent calculations. It may also be desirable to elevate this threshold by some amount to reduce further the possibility of including unreliable vectors. One approach is to use the weighted sum of the total histogram average and the peak value of the histogram, P:

$$T = a * \mu_{Total} + (1-a) * P \quad (3)$$

where a is a number between 0 and 1. If a=0, the threshold is the peak value of the histogram, which corresponds to retaining only the mode of the histogram.

In the present invention, it may also be advantageous to process the histogram prior to computing the threshold and/or applying the threshold to the histogram. Such preprocessing can include smoothing the histogram with simple linear filters. This smoothing process reduces local variations in the histogram which can lead to more robust exclusion of unreliable motion vectors, while still retaining reliable motion vectors.

Another aspect of the invention is a histogram processing method that computers separate one-dimensional (1-D) motion vector histograms for the x and y translation components. The motivation for this processing is that, in certain image regions, the x component may be accurate while the y component is inaccurate, or vice versa. By forming 1-D histograms and computing individual thresholds, $T_x$ and $T_y$, for the horizontal and vertical components, respectively, it is possible that more reliable vectors for both the x and y components may be retained.

Referring again to FIG. 1, the thresholded motion vector histograms is then sent to an averaging unit 105 to compute average horizontal and vertical translation vectors for each of the frames. After thresholding to eliminate the unreliable vectors, the following relationship exists:

$$H_{thresh}(x,y,t) \approx H_{reliable}(x,y,t). \quad (4)$$

That is, the thresholded motion vector histogram contains primarily reliable motion vectors.

The average horizontal and vertical translation vectors at a given time t are then computed as:

$$\bar{x}(t) = \sum_{x,y} x * H_{thresh}(x, y, t) \Big/ \sum_{x,y} H_{thresh}(x, y, t), \quad (5)$$

$$\bar{y}(t) = \sum_{x,y} y * H_{thresh}(x, y, t) \Big/ \sum_{x,y} H_{thresh}(x, y, t), \quad (6)$$

where $\bar{x}(t)$ is average horizontal translation vector and $\bar{y}(t)$ is the average vertical translation vector at time t. The invention uses simple averages of the histogram values because adjacent frames in sequence (assuming they come from the same scene) will contain roughly the same object undergoing smoothly varying local motion. This is expected as physical objects have mass, and thus cannot change speed or direction instantaneously. Regardless of the number and extent of moving objects, it is expected that the cumulative motion (i.e., the average horizontal and vertical motion vectors) will be smoothly varying from frame-to-frame. Further, besides local motion, there is also global motion such as desired camera motion (pan, zoom, etc.) and unwanted motion (jitter, camera shake, etc.). The desired camera motion is also typically smooth (particularly in professional cinema), but the unwanted motion will be rapidly and randomly varying. As a result, the average motion of all objects in the scene will tend to vary smoothly from frame-to-frame, while the global motion components introduced by the unwanted motion of jitter, camera shake, etc. generally will not vary smoothly.

Figure 3:
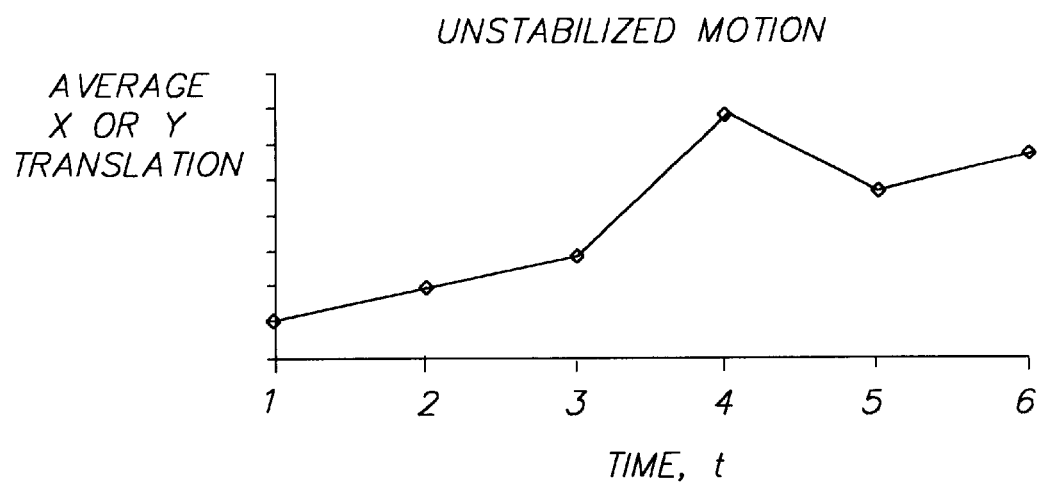
FIG. 3 is a graph illustrating unwanted motion according to the invention.

Because the unwanted motion components vary more rapidly than the desired motion, the invention filters the average horizontal and vertical motion vectors over a number of frames to extract unwanted motion, using a temporal filtering unit 106 in FIG. 1. As explained above, the average horizontal and vertical translations should change gradually from frame to frame in the case of the desired motion. Therefore, any motion that deviates from a smoothly varying trend will be identified as unwanted motion. For example, and shown in FIG. 3, the average horizontal or vertical component is plotted against time for frames 1–6. As shown, frame 4 deviates from the smooth progression of frames 1–3, 5 and 6. Therefore, frame 4 is identified as having unwanted motion and thus requires stabilization.

Figure 4:
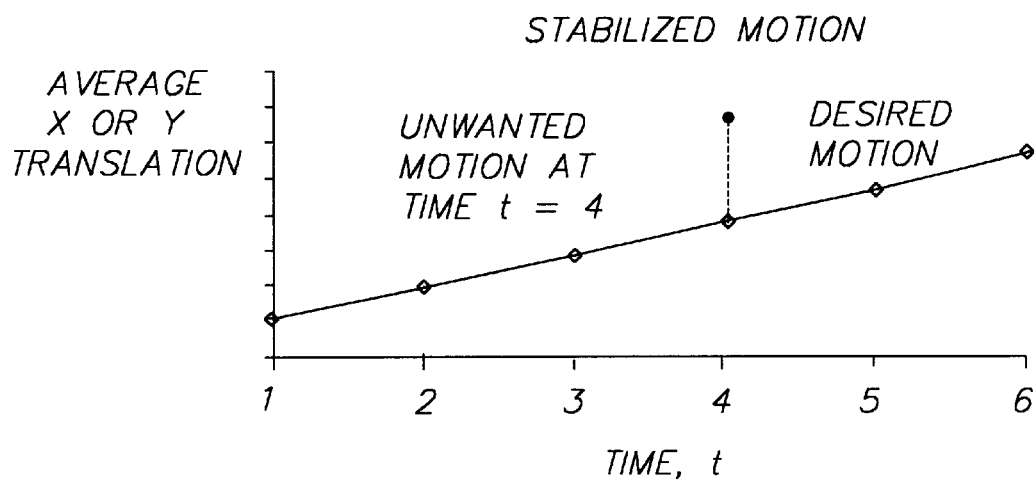

To compute the unwanted motion that must be removed from frame 4, standard filtering techniques can be applied to the time series formed from the average translation vectors. The unwanted motion is assumed to consist of high frequency components, and highpass filtering can be used to directly extract this unwanted motion. Alternatively, lowpass filtering can be used to extract the desired low frequency motion, and the resulting smoothed translation vectors can then be subtracted from the average motion vectors to compute the unwanted high frequency components. These two approaches for extracting the unwanted motion are entirely equivalent. The desired motion and corresponding unwanted motion components of frame 4 are shown in FIG. 4. This unwanted motion component can be used to determine the amount of horizontal and/or vertical stabilization required to correct frame 4.

In a preferred embodiment to reduce buffering requirements, a simple FIR (finite impulse response) highpass filter is used to extract the unwanted high frequency motion from the item series of average horizontal and vertical translations. The length of the filter, N, which corresponds to number of frames that must be buffered, has a significant impact on the removal of unwanted frequency components from the global motion estimate. A tradeoff occurs between the lowest frequency that can be removed and the number of frames that must be buffered. A user is preferably given the option of having direct control over the degree of filtering in both the horizontal and vertical directions, and the impact of removing certain components of the unwanted motion can be viewed interactively. Besides the length of the filter, a user can also be given control over the maximum rate-of-change of the desired motion, thus providing an adjustment of the slew rate of the desired motion.

The user of the motion vector histogram in extracting unwanted motion also provides another benefit that is not readily apparent. As mentioned previously, the clusters 200 in FIG. 2 represent regions in an image that are moving with the same velocity and directions. It is possible to track each of these motion vector clusters as separate entities over successive frames, thereby producing multiple estimates for the unwanted motion. These multiple estimates can then be combined in a variety of ways to produce a single estimate for the unwanted motion. For example, a weighted sum of the individual estimates could be formed, where the weights are determined by the degree of confidence in each individual estimate.

Now, the output of the temporal filtering unit 106 in FIG. 1 is an estimate of the unwanted global motion in both the horizontal and vertical directions at a given time t. The unwanted horizontal motion is denoted as $x_u(t)$ and the unwanted vertical motion is denoted as $y_u(t)$. Given this estimate, the corresponding input frame for time t is stabilized relative to the reference frame (which is typically the first frame in the sequence) using a stabilizing unit 107. The stabilization process is done through simple horizontal and vertical displacements of the current frame. The estimates for the unwanted motion will typically be non-integer values, which means a standard image interpolation method (such as bilinear or cubic interpolation) is required to allow sub-pixel displacements. Sub-pixel displacements are also required to put any unwanted, but uncompensated, motion to levels below the human perceptual thresholds.

Figure 5:
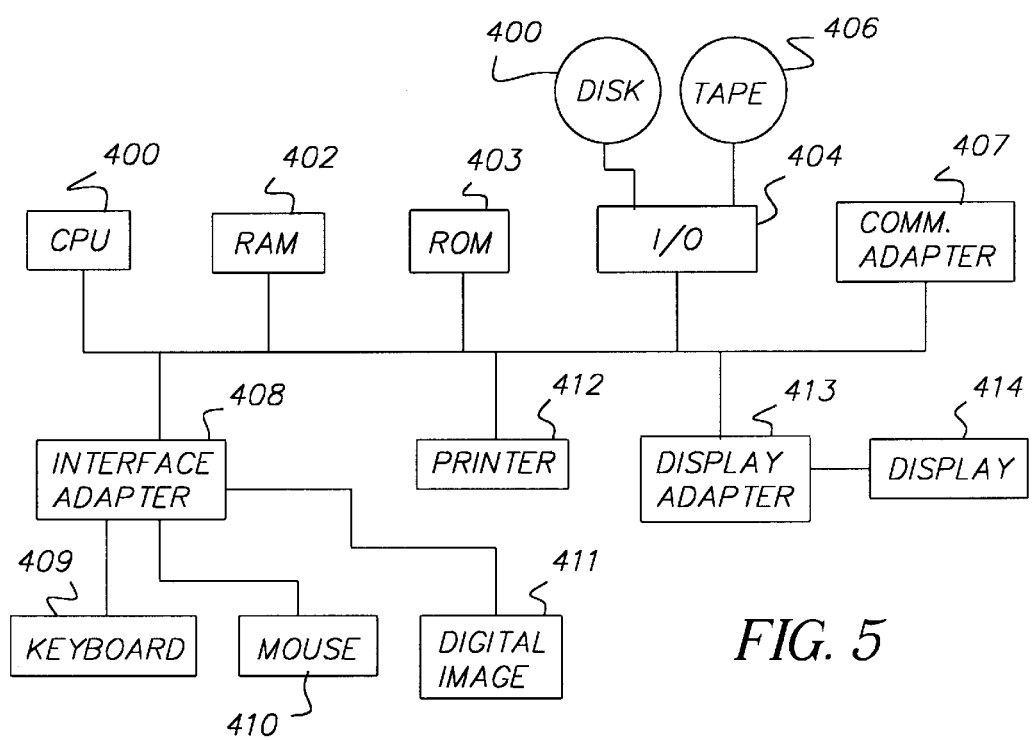
FIG. 4 is a graph illustrating the removal of unwanted motion according to the invention and FIG. 5 is a hardware embodiment of a computer system for operating the invention.

While the overall methodology of the invention is described above, the invention can be embodied in any number of different types of systems and executed in any number of different ways, as would be known by one ordinarily skilled in the art. For example, as illustrated in FIG. 5, a typical hardware configuration of an information handling/computer system in accordance with the invention preferably has at least one processor or central processing unit (CPU) 400. The CPU 400 is interconnected via a system bus 401 to a random access memory (RAM) 402, read-only memory (ROM) 403, input/output (I/O) adapter 404 (for connecting peripheral devices such as disk units 405 and tape drives 406 to the bus 401), communication adapter 407 (for connecting an information handling system to a data processing network) user interface adapter 408 (for connecting peripheral 409, 410, 411 such as a keyboard, mouse, digital image input unit, microphone speaker and/or other user interface device to the bus 401), a printer 412, and a display adapter 413 (for connecting the bus 401 to a display device 414). The invention could be implemented using the structure shown in FIG. 5 by including the inventive method within a computer program stored on the storage device 405. Such a computer program would act on an unstabilized time series of image frames supplied through the interface units 409, 410, 411 or through the network connection 407. The system would then automatically produce the desired stabilized digital image frame series output on the display 414, through the printer 412 or back to the network 407.

The invention removes jitter from film-originated sequences as part of the image processing that is performed during, for example, the telecine acquisition process. However, as would be known by one ordinarily skilled in the art given this disclosure, the invention is not limited to such an application and could be applied to video-originated sequences to remove unwanted translational camera motion. Moreover, the invention operates in a fully automated manner with no user invention, although the user may be given control over some system parameters to control the degree of stabilization. The invention has relatively low complexity and could operate in real-time on an image sequence given sufficient computer hardware. Finally, the user of a motion vector histogram to extract unwanted motion provides the opportunity to track multiple motion vector clusters, which can result in improved estimates for the unwanted motion as compared to computing a simple average from all motion vectors.

While the invention has been described in terms of preferred embodiments, those skilled in the art will recognize that the invention can be practiced with modification within the spirit and scope of the appended claims.

What is claimed is:

1. A method for stabilizing an image sequence formed from a plurality of successive frames comprising:

calculating motion vectors for each of said frames, wherein said motion vectors follow corresponding points between adjacent frames;

forming a motion vector histogram for each of said frames from horizontal and vertical components of said motion vectors;

removing unreliable motion vectors from said motion vector histogram to form a processed motion vector histogram for each of said frames;

generating average horizontal and vertical components from said processed motion vector histogram for each of said frames;

filtering said average horizontal and vertical components from two or more successive frames to identify unwanted horizontal and vertical components for each of said frames; and translating each frame by said unwanted horizontal and vertical components.

2. The method in claim 1, wherein said filtering comprises highpass filtering.

3. The method in claim 1, wherein said removing includes discarding motion vectors from said motion vector histogram, which have values below a threshold.

4. The method in claim 3, wherein said threshold is determined adaptively for each of said frames.

5. A method for stabilizing an image sequence formed from a plurality of successive frames comprising:

calculating motion vectors for each of said frames, wherein said motion vectors follow corresponding points between adjacent frames;

forming a motion vector histogram for each of said frames from horizontal and vertical components of said motion vectors;

removing unreliable motion vectors from said motion vector histogram to form a processed motion vector histogram for each of said frames;

generating average horizontal and vertical components from said processed motion vector histogram for each of said frames;

filtering said average horizontal and vertical components from two or more successive frames to identify unwanted horizontal and vertical components for each of said frames; and translating each frame by said unwanted horizontal and vertical components;

wherein said filtering is user-adjustable.

6. The method in claim 5, wherein said removing includes discarding values from said motion vector histogram below a threshold.

7. The method in claim 6, wherein said threshold is user-adjustable.

8. A method for stabilizing an image sequence formed from a plurality of successive frames comprising:

calculating motion vectors for each of said frames, wherein said motion vectors follow corresponding points between adjacent frames;

forming a motion vector histogram for each of said frames from horizontal and vertical components of said motion vectors;

removing unreliable motion vectors from said motion vector histogram to form a processed motion vector histogram for each of said frames;

generating average horizontal and vertical components from said processed motion vector histogram for each of said frames;

filtering said average horizontal and vertical components from two or more successive frames to identify unwanted horizontal and vertical components for each of said frames; and translating each frame by said unwanted horizontal and vertical components;

wherein said removing includes discarding values from said motion vector histogram below a threshold and said threshold is determined adaptively for each of said frames.

9. A computerized digital image system for stabilizing an image sequence formed from a number of successive frames comprising:

a motion estimator calculating motion vectors for each of said frames, wherein said motion vectors follow corresponding points between adjacent frames;

a histogram generator forming a motion vector histogram for each of said frames from horizontal and vertical components of said motion vectors;

a processor removing unreliable motion vectors from said motion vector histogram to form a processed motion vector histogram for each of said frames;

an averaging unit generating average horizontal and vertical components from said processed histogram for each of said frames;

a filter filtering said average horizontal and vertical components from two or more successive frames to identify unwanted horizontal and vertical components of each of said frames; and a stabilizing unit translating each frame by said unwanted horizontal and vertical components.

10. The computerized digital imaging system in claim 9, wherein said filter comprises a highpass filter.

11. The computerized digital imaging system in claim 9, wherein said processor discards values from said motion vector below a threshold.

12. The computerized digital imaging system in claim 11, wherein said processor includes a user interface for adjusting said threshold.

13. A computerized digital image system for stabilizing an image sequence formed from a number of successive frames comprising:

a motion estimator calculating motion vectors for each of said frames, wherein said motion vectors follow corresponding points between adjacent frames;

a histogram generator forming a motion vector histogram for each of said frames from horizontal and vertical components of said motion vectors;

a processor removing unreliable motion vectors from said motion vector histogram to form a processed motion vector histogram for each of said frames;

an averaging unit generating average horizontal and vertical components from said processed histogram for each of said frames;

a filter filtering said average horizontal and vertical components from two or more successive frames to identify unwanted horizontal and vertical components of each of said frames; and a stabilizing unit translating each frame by said unwanted horizontal and vertical components;

wherein said filter includes a user interface for adjusting said filter.

14. A method for stabilizing an image sequence formed from a plurality of successive frames comprising:

calculating motion vectors for each of said frames;

forming a motion vector histogram for each of said frames;

generating average horizontal and vertical components from said motion vector histogram for each of said frames;

identifying unwanted horizontal and vertical components for each of said frames based on said average horizontal and vertical components; and translating each frame by said unwanted horizontal and vertical components; and further comprising removing unreliable motion vectors from said motion vector histogram for each of said frames.

15. The method in claim 14, wherein said motion vectors follow corresponding points between adjacent frames.

16. The method in claim 14, wherein said motion vector histogram comprises horizontal and vertical components of said motion vectors.

17. The method in claim 14, wherein said identifying includes filtering said average horizontal and vertical components from two or more successive frames to identify unwanted horizontal and vertical components for each of said frames.

18. The method in claim 14, wherein said removing includes discarding values from said motion vector histogram below a threshold.

19. The method in claim 18, wherein said threshold is user-adjustable.

20. The method in claim 18, wherein said threshold is determined adaptively for each of said frames.

21. A method for stabilizing an image sequence formed from a plurality of successive frames comprising:

calculating motion vectors for each of said frames;

forming a motion vector histogram for each of said frames;

generating average horizontal and vertical components from said motion vector histogram for each of said frames;

identifying unwanted horizontal and vertical components for each of said frames based on said average horizontal and vertical components; and translating each frame by said unwanted horizontal and vertical components;

wherein said identifying includes filtering said average horizontal and vertical components from two or more successive frames to identify unwanted horizontal and vertical components for each of said frames; and wherein said filtering comprises highpass filtering.

22. The method in claim 21, wherein said motion vectors follow corresponding points between adjacent frames.

23. The method in claim 21, wherein said motion vector histogram comprises horizontal and vertical components of said motion vectors.

24. A method for stabilizing an image sequence formed from a plurality of successive frames comprising:

calculating motion vectors for each of said frames;

forming a motion vector histogram for each of said frames;

generating average horizontal and vertical components from said motion vector histogram for each of said frames;

identifying unwanted horizontal and vertical components for each of said frames based on said average horizontal and vertical components; and translating each frame by said unwanted horizontal and vertical components;

wherein said identifying includes filtering said average horizontal and vertical components from two or more successive frames to identify unwanted horizontal and vertical components for each of said frames; and wherein said filtering is user-adjustable.

25. The method in claim 24, wherein said motion vectors follow corresponding points between adjacent frames.

26. The method in claim 24, wherein said motion vector histogram comprises horizontal and vertical components of said motion vectors.

27. A method of using a computer program for stabilizing an image sequence formed from a plurality of successive frames comprising:

using said computer program to calculate motion vectors for each of said frames;

using said computer program to form a motion vector histogram for each of said frames;

using said computer program to generate average horizontal and vertical components from said motion vector histogram for each of said frames;

using said computer program to identify unwanted horizontal and vertical components for each of said frames based on said average horizontal and vertical components; and using said computer program to translate each frame by said unwanted horizontal and vertical components; and further comprising using said computer program to remove unreliable motion vectors from said motion vector histogram for each of said frames.

28. The method in claim 27, wherein said motion vectors follow corresponding points between adjacent frames.

29. The method in claim 27, wherein said motion vector histogram comprises horizontal and vertical components of said motion vectors.

30. The method in claim 27, wherein said using said computer program to identify unwanted horizontal and vertical components for each of said frames includes using said computer program to filter said average horizontal and vertical components from two or more successive frames.

31. The method in claim 27, wherein said using said computer program to remove includes using said computer program to discard values from said motion vector histogram below a threshold.

32. The method in claim 31, wherein said threshold is user-adjustable.

33. A method of using a computer program for stabilizing an image sequence formed from a plurality of successive frames comprising:

using said computer program to calculate motion vectors for each of said frames;

using said computer program to form a motion vector histogram for each of said frames;

using said computer program to generate average horizontal and vertical components from said motion vector histogram for each of said frames;

using said computer program to identify unwanted horizontal and vertical components for each of said frames based on said average horizontal and vertical components; and using said computer program to translate each frame by said unwanted horizontal and vertical components; and wherein said using said computer program to identify unwanted horizontal and vertical components for each of said frames includes using said computer program to filter said average horizontal and vertical components from two or more successive frames; and wherein said using said computer program to filter comprises using said computer program to highpass filter.

34. A method of using a computer program for stabilizing an image sequence formed from a plurality of successive frames comprising:

using said computer program to calculate motion vectors for each of said frames;

using said computer program to form a motion vector histogram for each of said frames;

using said computer program to generate average horizontal and vertical components from said motion vector histogram for each of said frames;

using said computer program to identify unwanted horizontal and vertical components for each of said frames based on said average horizontal and vertical components; and using said computer program to translate each frame by said unwanted horizontal and vertical components; and wherein said using said computer program to identify unwanted horizontal and vertical components for each of said frames includes using said computer program to filter said average horizontal and vertical components from two or more successive frames; and wherein said using said computer program to filter is user-adjustable.

35. A method of using a computer program for stabilizing an image sequence formed from a plurality of successive frames comprising:

using said computer program to calculate motion vectors for each of said frames;

using said computer program to form a motion vector histogram for each of said frames;

using said computer program to remove unreliable motion vectors from said motion vector histogram to form a processed motion vector histogram for each of said frames;

using said computer program to generate average horizontal and vertical components from said motion vector histogram for each of said frames;

using said computer program to identify unwanted horizontal and vertical components for each of said frames based on said average horizontal and vertical components; and using said computer program to translate each frame by said unwanted horizontal and vertical components;

wherein said using said computer program to remove includes using said computer program to discard values from said motion vector histogram below a threshold and said threshold is determined adaptively by said computer program for each of said frames.

36. A method for stabilizing an image sequence formed from a plurality of successive frames comprising:

calculating a plurality of motion vectors for each of said frames, wherein said motion vectors follow corresponding points between adjacent frames;

forming a motion vector histogram for each of said frames from horizontal and vertical components of said motion vectors;

removing unreliable motion vectors from said motion vector histogram to form a processed motion vector histogram for each of said frames;

generating average horizontal and vertical components from said processed motion vector histogram for each of said frames;

filtering said average horizontal and vertical components from two or more successive frames to identify unwanted horizontal and vertical components for each of said frames; and translating each frame by said unwanted horizontal and vertical components;

wherein said filtering is adjustable.

37. The method of claim 36, wherein said filtering is user-adjustable.

* * * * *